W. MACK.
BIRD BATH HOUSE.
APPLICATION FILED JUNE 2, 1914.

1,227,471.

Patented May 22, 1917.

WITNESSES
Frank C. Palmer.
Geo. J. Hoster

INVENTOR
William Mack
BY Munn & Co
ATTORNEYS

UNITED STATES PATENT OFFICE.

WILLIAM MACK, OF NEW YORK, N. Y.

BIRD BATH-HOUSE.

1,227,471.

Specification of Letters Patent.   Patented May 22, 1917.

Application filed June 2, 1914. Serial No. 842,350.

*To all whom it may concern:*

Be it known that I, WILLIAM MACK, a citizen of the United States, and a resident of the city of New York, borough of Manhattan, in the county and State of New York, have invented a new and Improved Bird Bath-House, of which the following is a full, clear, and exact description.

The invention relates to bird cages, and its object is to provide a new and improved bird bath house arranged for convenient attachment to a bird cage at the door opening to allow the bird to pass from the bird cage into the bath house to take a bath and then return to the cage, the bath house being arranged to allow of conveniently filling and emptying the bath tub.

In order to produce the desired result use is made of a bath tub in the form of a drawer slidably mounted in the lower portion of the bath house.

A practical embodiment of the invention is represented in the accompanying drawings forming a part of this specification, in which similar characters of reference indicate corresponding parts in all the views.

Figure 1:
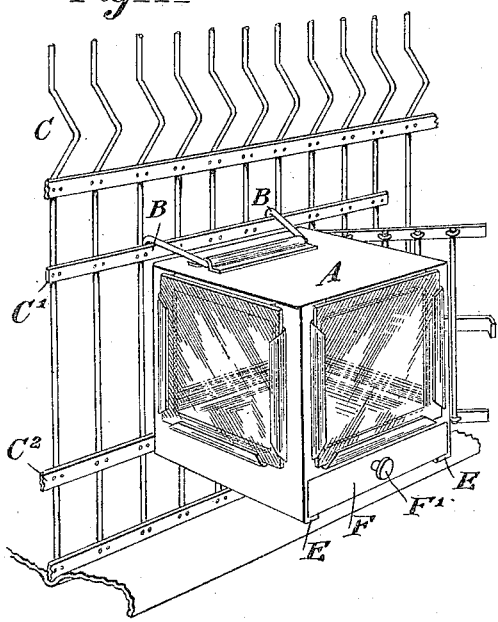
Figure 1 is a perspective view of the bird bath house as applied to a bird cage.
Figure 2:
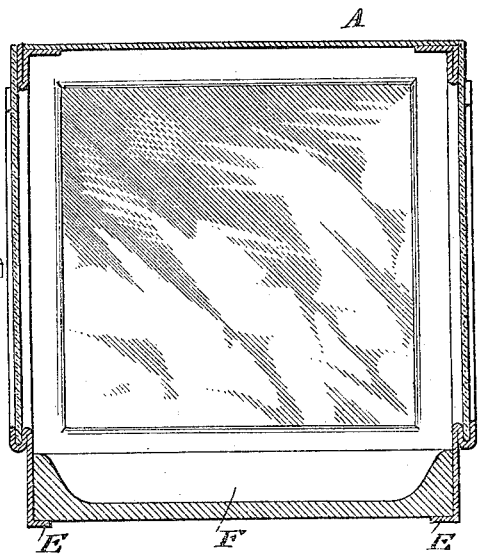
Fig. 2 is a sectional side elevation of the same on the line 2—2 of Fig. 3.
Figure 3:
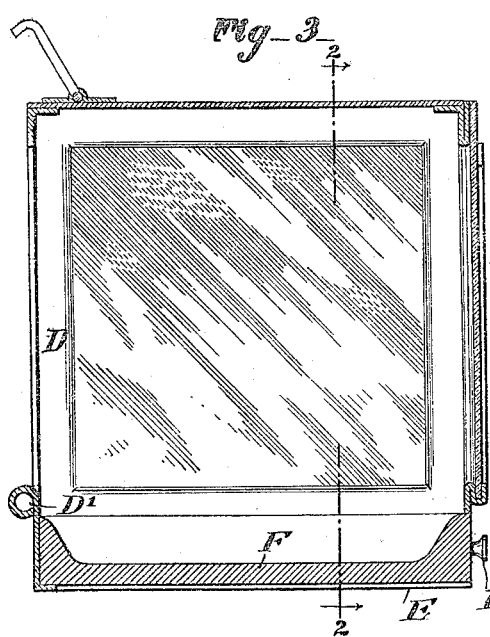
Fig. 3 is a cross section of the same.
Figure 4:
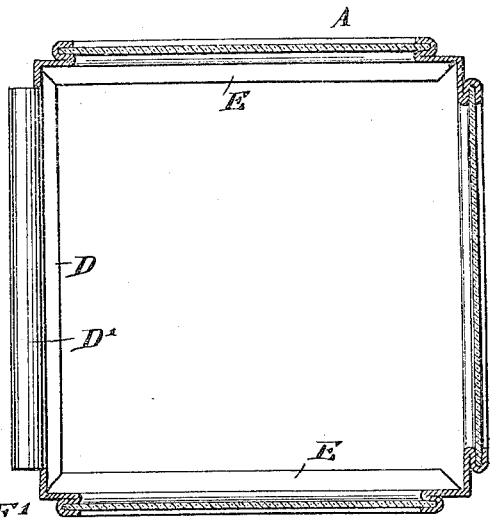
Fig. 4 is a sectional plan view of the same with the bath tub removed.

The housing A of the bird bath house is preferably in the form of a box provided on top with hooks B adapted to hook onto the top bar C' of the door opening of the bird cage C, as plainly indicated in Fig. 1. The housing A is provided at the front, rear and sides with openings, the openings at the sides and the rear being closed preferably by panes of glass, celluloid or other diaphanous material to allow the light to pass into the housing. The housing is provided at the outer face at the sides and rear with flanges arranged at the margin of the openings at the sides and bottom thereof, and forming guideways, to receive the said panes. The opening D at the front end of the housing A registers with the door opening of the bird cage so that the bird can readily pass from the cage into the housing A to take a bath and then return to the cage C. It is understood that when the housing A is applied to the cage the door thereof is first opened, as indicated in Fig. 1. The bottom D' of the opening D is preferably curved to form a perch for the bird to hop on during its passage into and out of the bath house. The front lower portion of the housing A is adapted to abut against the bottom bar C² of the door opening so as to securely hold the housing in position on the front of the bird cage. The bottom of the housing A is provided with guideways E on which is mounted to slide a bath tub F in the form of a drawer which forms the bottom of the housing and which is adapted to contain the water for the bath. The outer end of the bath tub F is provided with a knob F' to permit of conveniently pulling the bath tub out of the housing A for emptying the bath water or refilling the tub with fresh water prior to attaching the housing A to the bird cage. It will be noticed that by the arrangement described the bath tub F can be conveniently filled with water while the housing A is in position on the bird cage C by drawing the bath tub F partly out and filling the same with water and then pushing the bath tub back. After the bird has taken a bath the drawer F can be pulled out and emptied of the soiled water and the housing A may be readily removed from the bird cage without danger of spilling any of the water.

The bird bath house shown and described is very simple and durable in construction and can be readily applied to a bird cage or removed therefrom as above set forth.

Having thus described my invention, I claim as new and desire to secure by Letters Patent:

1. A bird bath house for removable attachment to a bird cage, comprising a housing in the form of a box open at one side to register with the door opening of the bird cage, the said housing being closed at the top and at the other sides, means on the top of the housing for removably attaching the same to the bird cage, the wall of the housing at the bottom of the opening in said open side being curved to form a perch, and a bath tub removably mounted in said housing and forming the bottom thereof.

2. The combination with a bird cage provided with a door opening having top and bottom transverse bars, of a bird bath house, comprising a rectangular housing having an open end adapted to register with the door opening of the bird cage, the housing being closed at the top and at the other ends, a projecting perch at the bottom of said end opening in the housing, hooks pivoted on the closed top of said housing and adapted to be swung downward into engagement with the said top bar of the door opening, the lower portion of said housing below the projecting perch being adapted to abut against the bottom bar of said door opening, and a bath tub removably mounted in said housing and forming the bottom thereof.

In testimony whereof I have signed my name to this specification in the presence of two subscribing witnesses.

WILLIAM MACK.

Witnesses:
 GEO. G. HOSTER,
 PHILIP D. ROLLHAUS.

Copies of this patent may be obtained for five cents each, by addressing the "Commissioner of Patents, Washington, D. C."